June 10, 1952

J. TALL 2,599,667

SPLICING BLOCK

Filed Nov. 28, 1950

INVENTOR.
Joel Tall
BY M. Bjoundas

Patented June 10, 1952

2,599,667

UNITED STATES PATENT OFFICE 2,599,667

SPLICING BLOCK

Joel Tall, New York, N. Y.

Application November 28, 1950, Serial No. 197,901

1 Claim. (Cl. 154—42.3)

This invention relates to splicing blocks, such as are used in splicing film and sound recording tape, and specifically it refers to a block which is particularly suitable for editing sound recording tape.

Tape recording is a comparatively new art and it has been found that due to the simplicity of this new medium new techniques and new features are possible, which were formerly unhead of. It is thus now possible to make a recording of a certain program, whereupon the tape editor may quickly cut out all objectionable parts and other parts, such as for instance added applause, may actually be added thus composing a more satisfactory final program. In editing the sound tape, it is necessary to cut the same and either to cut out a piece or to insert a piece, whereupon the ends are joined together. If this new joint or splice is not properly made, it may cause clicks and may give various types of trouble including actual breakage of the tape. The present block has been invented for the purpose of making a perfect splice as quickly as possible, and thereby eliminate all troubles, which may arise from the splicing of the tape.

The main object of my invention, therefore, is to furnish a splicing block which will permit the tape editor to make a perfect splice in a minimum of time.

An ancillary object of my invention is to furnish a splicing block which can be manufactured at low cost and which is practical, easy to operate, and which does not tire the operator in any way.

Other objects and advantages of my invention will be apparent during the course of the following description and claim.

Figure 1:
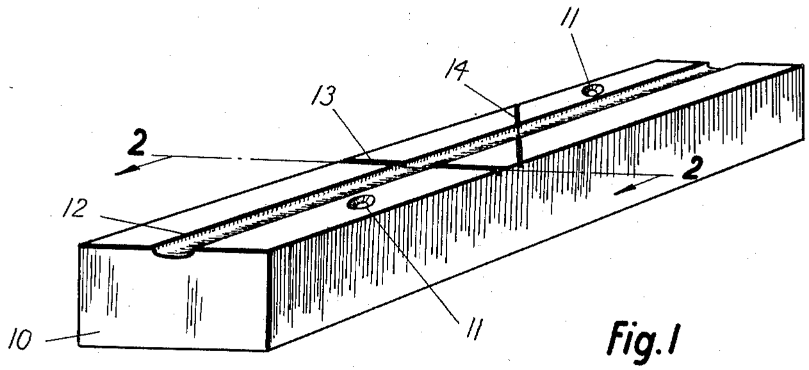
Figure 2:
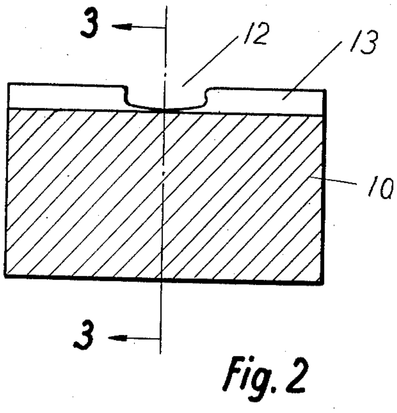
Figure 3:
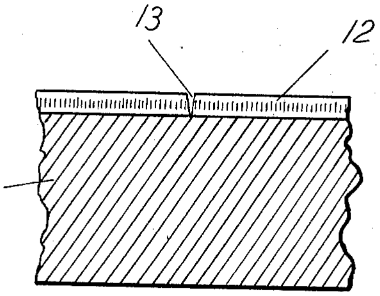
Figure 4:
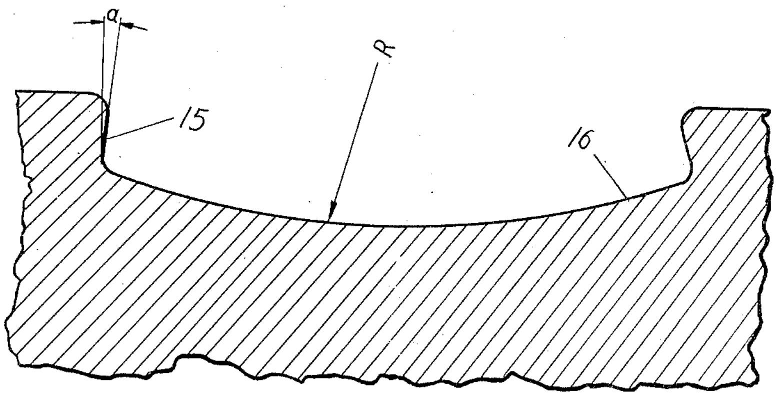

In the accompanying drawing, forming a part of this specification, and in which like numerals are employed to designate like parts throughout the same, Figure 1 represents a perspective view of a splicing block embodying my invention, Figure 2 is a section taken along line 2—2 in Figure 1, Figure 3 is a section taken along line 3—3 in Figure 2, and, Figure 4 represents an enlarged section of the groove.

In the drawings, wherein for the purpose of illustration is shown a preferred embodiment of my invention, the block 10 is made from a suitable non-magnetizable metal such as aluminum and is of rectangular cross section. The numeral 11 designates the mounting holes in the block 10, by means of which the block 10 may be fastened to a table or other object.

A longitudinal groove 12 extends from one end of the block 10 to the other. At a point somewhere near the middle of the block 10, there is a transverse slit 13, at ninety degrees to the longitudinal groove 12. At another point, there is a transverse slit or groove 14 at forty-five degrees to the longitudinal groove 12. The grooves 13 and 14 are for the purpose of guiding a razor blade used in cutting the tape.

Referring now to Figure 4, it will be noted that the sides 15 of the groove 12 taper inwardly at an angle $a$. The bottom 16, of the groove 12, has a slight curvature with the radius R. The inwardly slanting side 15, and the curved bottom 16, of the groove 12, co-act to hold the sound tape in a firm grip, when the tape is pressed down in the groove 12 with the tips of the fingers. Sound recording tape is usually made ¼" wide and is furnished with great accuracy which fact is made use of in this case. By this simple and satisfactory arrangement it is thus possible to grip the sound recording tape securely, and hold it in place during the splicing operation.

The grooves 13 and 14 are just narrow slits as illustrated in cross section in Figure 3, and are used for the purpose of guiding a razor blade when cutting the tape. The groove 13 is used when the tape is cut at ninety degrees while the groove 14 is used for cutting at forty-five degrees. The most satisfactory splice of sound recording tape is obtained when cutting the tape at forty-five degrees.

The operation of my invention is as follows: The tape to be edited is stretched into the slot 12 of the splicing block 10, and by means of the tips of the fingers, the tape is pushed down against the bottom of the groove until it is held in a firm grip between the slanting edges 15 of the groove 12, and the curved bottom 16, of said groove. The tape is next cut by sliding the cutting edge through the groove 14. A piece may be cut out or a new piece may be inserted; in both cases the procedure is the same. The two ends to be spliced are then brought together in the groove, and care is taken to see that the ends abut properly and are in proper alignment and intimate contact along the cut. A piece of splicing tape is next pressed down over the splice, the tape is now removed from the groove and the excess splicing tape is cut on both sides of the sound tape.

The splicing tape may be pre-cut several thousands of an inch narrower than the magnetic tape and manufactured in such a fashion that a piece of splicing tape can be quickly detached from its roll and affixed to the recording tape splicing point.

It is found to be good practice to undercut the splicing tape (adhesive tape) at the point of the splice by a few thousandths of an inch to prevent any interference by same when the sound recording tape is passing through its various paths. Long experience has proven that by proceeding as described above, a perfect splice will follow, which will give lasting satisfaction.

It is to be understood that the form of my invention, herewith shown and described, is to be taken as a preferred example of the same, and it is obvious that various changes in the shape, size and arrangement of parts may be resorted to without departing from the spirit of my invention, or the scope of the subjoined claim.

Having thus described my invention, I claim:

A sound tape splicing block of the character described having a longitudinal groove along its top face, said groove being slightly narrower than the sound tape to be spliced, the sides of said groove having a slight angle from the vertical in such a manner that its outer edge will be narrower than at the bottom of the groove, said groove, furthermore, having a slight concave curvature in its bottom, and said block having a plurality of transverse grooves which traverse said longitudinal groove at ninety and forty-five degrees.

JOEL TALL.

REFERENCES CITED

The following references are of record in the file of this patent:

UNITED STATES PATENTS

| Number | Name | Date |
|---|---|---|
| 469,159 | Maroske | Feb. 16, 1892 |
| 731,794 | Larson | June 23, 1903 |
| 731,919 | Larson | June 23, 1903 |
| 2,446,576 | DeVry | Aug. 10, 1948 |
| 2,518,801 | Ludwig | Aug. 15, 1950 |
| 2,552,148 | Carson | May 8, 1951 |